United States Patent
Naim et al.

(10) Patent No.: US 10,212,729 B1
(45) Date of Patent: Feb. 19, 2019

(54) SYSTEMS AND METHODS FOR IMPLICIT INFORMATION TRANSFER

(71) Applicant: Sprint Spectrum LP, Overland Park, KS (US)

(72) Inventors: Muhammad Ahsan Naim, Ashburn, VA (US); Yu Zhou, Herndon, VA (US); Luca Zappaterra, Eindhoven (NL)

(73) Assignee: Sprint Spectrum L.P., Overland Park, KS (US)

(*) Notice: Subject to any disclaimer, the term of this patent is extended or adjusted under 35 U.S.C. 154(b) by 27 days.

(21) Appl. No.: 15/375,389

(22) Filed: Dec. 12, 2016

(51) Int. Cl.
*H04W 72/12* (2009.01)
*H04W 72/08* (2009.01)

(52) U.S. Cl.
CPC ..... *H04W 72/1289* (2013.01); *H04W 72/082* (2013.01)

(58) Field of Classification Search
None
See application file for complete search history.

(56) References Cited

U.S. PATENT DOCUMENTS

| | | | |
|---|---|---|---|
| 2013/0286849 A1* | 10/2013 | Park | H04B 7/024 370/241 |
| 2014/0286283 A1* | 9/2014 | Kim | H04W 52/243 370/329 |
| 2015/0029907 A1 | 1/2015 | Cucala Garcia | |
| 2015/0312901 A1* | 10/2015 | Yoshizawa | H04W 72/042 370/329 |
| 2016/0173148 A1* | 6/2016 | Kazmi | H04W 52/244 455/296 |
| 2016/0255631 A1* | 9/2016 | Cui | H04W 72/1242 370/329 |
| 2017/0048872 A1* | 2/2017 | Chiu | H04W 16/02 |
| 2017/0207827 A1* | 7/2017 | Cui | H04B 7/024 |

* cited by examiner

*Primary Examiner* — Diane L Lo (57) ABSTRACT

Systems and methods are described for implicit information transfer. Neighboring access nodes may coordinate an Almost Blank Subframe (ABS) pattern for ABS transmissions. Implicit transmit symbols may be assigned to ABS' of the ABS pattern. Traffic may be scheduled for a wireless device on at least one ABS of the ABS pattern. The neighboring access nodes may use the scheduled ABS to decode implicit information associated with the implicit transmit symbols.

15 Claims, 7 Drawing Sheets

SYSTEMS AND METHODS FOR IMPLICIT INFORMATION TRANSFER

TECHNICAL BACKGROUND

In a Heterogeneous Network (HetNet), a mix of macro access nodes (ANs), Remote Radio Heads (RRH), and low-power ANs (e.g., picocells, femtocells, and relays) may be leveraged to increase network capacity. For example, macro ANs may consolidate wireless spectrum and/or frequency bands using advanced techniques (e.g., carrier aggregation (CA), multi-antenna techniques (MIMO), coordinated multipoint (CoMP), etc.) to "free-up" wireless spectrum for allocation to low-power ANs deployed within radio range(s) (i.e., minimum usable signal area) of the macro ANs. Under low Signal-to-Interference-Plus Noise ratio (SINR) conditions, where received powers are low due to attenuation, such techniques are not as effective. In addition, aggressive deployment of low-power ANs (e.g., in an ad hoc manner) within a radio range of the macro AN may result in decreased throughput to wireless devices operating at cell edges of the low-power ANs (or macro ANs) due to radio interference from neighboring cells. Radio interference may significantly degrade overall network performance.

Enhanced Inter-Cell Interference Coordination (eICIC) techniques (e.g., subframe alignment using Almost Blank Subframes (ABS), Orthogonal Frequency-Division Multiplexing (OFDM) Symbol Shift, etc.) create opportunities for wireless devices operating at cell edges of low-power ANs and/or macro ANs to receive Downlink (DL) information from the network without interference from neighboring cells. Macro ANs may assign patterns of ABS to low-power ANs and/or coordinate ABS patterns with neighboring ANs to reduce interference at the cell edges of low-power ANs and/or macro ANs.

OVERVIEW

Systems and methods are described for implicit information transfer. For example, an Almost Blank Subframe (ABS) pattern may be generated at a first AN for the first AN and a second AN; the second AN is located within a radio range of the first AN. Bit sequences may be assigned to select ABS' of the generated ABS pattern. Traffic may be scheduled for the second AN on the select ABS'. A neighboring ANs may identify implicit information conveyed from the second AN based on the scheduled ABS'.

In another embodiment, neighboring ANs may coordinate an ABS pattern for ABS transmission. Implicit transmit symbols may be assigned to ABS' of the ABS pattern. Traffic may be scheduled for a wireless device on at least one ABS of the ABS pattern; the neighboring ANs may use the scheduled ABS to decode implicit information (e.g., based on the assigned implicit transmit symbols). Alternatively, a common ABS pattern comprising a plurality of ABS' may be generated and implicit information may be assigned to each of the plurality of ABS'. Traffic may be scheduled for a first AN on at least one ABS of the plurality of ABS'. Implicit information may be decoded at a second AN based on the scheduled ABS.

In yet another embodiment, a common ABS pattern may be generated at first and second macro ANs (e.g., high-power ANs). ABS' of the ABS pattern may be labeled with implicit information. At least one labeled ABS may be assigned to a small AN (e.g., a low-power AN) for data transmission. The implicit information may be decoded at the first or second macro ANs based on the assigned ABS.

DETAILED DESCRIPTION

As wireless networks develop, migration from voice-centralized services to data-centralized services (e.g., internet, applications, cloud-based services including video and other bandwidth-intensive content, etc.) continues to boost traffic at macro ANs, which traffic has grown exponentially. The want for high Quality of Service (QoS) coupled with a shortage of wireless spectrum makes it challenging for network operators to meet multiple users' bandwidth and/or throughput demands simultaneously. Heterogeneous Networks (HetNet) deploy a multilayer structure, which mixes macro ANs, RRHs, and/or low-power ANs (e.g., picocells, femtocells, and relays) configured to interoperate and increase network capacity. Different operating modes (e.g., Closed Subscriber Group (CSG), etc.) and/or Downlink (DL) signal strengths of macro ANs, RRHs, and/or low-power ANs, may cause cell-edge users to experience radio interference (or degradation) resultant from neighboring cells (e.g., macro ANs, RRHs, and/or low-power ANs). Enhanced Inter-cell Interference Coordination (eICIC) techniques/schemes (e.g., subframe alignment using Almost Blank Subframe (ABS'), Orthogonal Frequency Division Multiplexing (OFDM) Symbol Shift, etc.) create opportunities to alleviate this degradation and improve "bit" rate at cell edges.

For example, ANs may use ABS patterns and/or schedule/designate ABS' to select ANs based on implicit information the ANs want (or need) to convey to neighboring ANs. Neighboring ANs may decode the implicit information by identifying the ABS' selected for the select ANS. Alternatively, the neighboring ANs can monitor a level of radio interference and, when a sudden drop in radio interference (e.g., resultant from ABS' scheduling) is detected, the neighboring ANs can decode the implicit information.

Figure 1A:
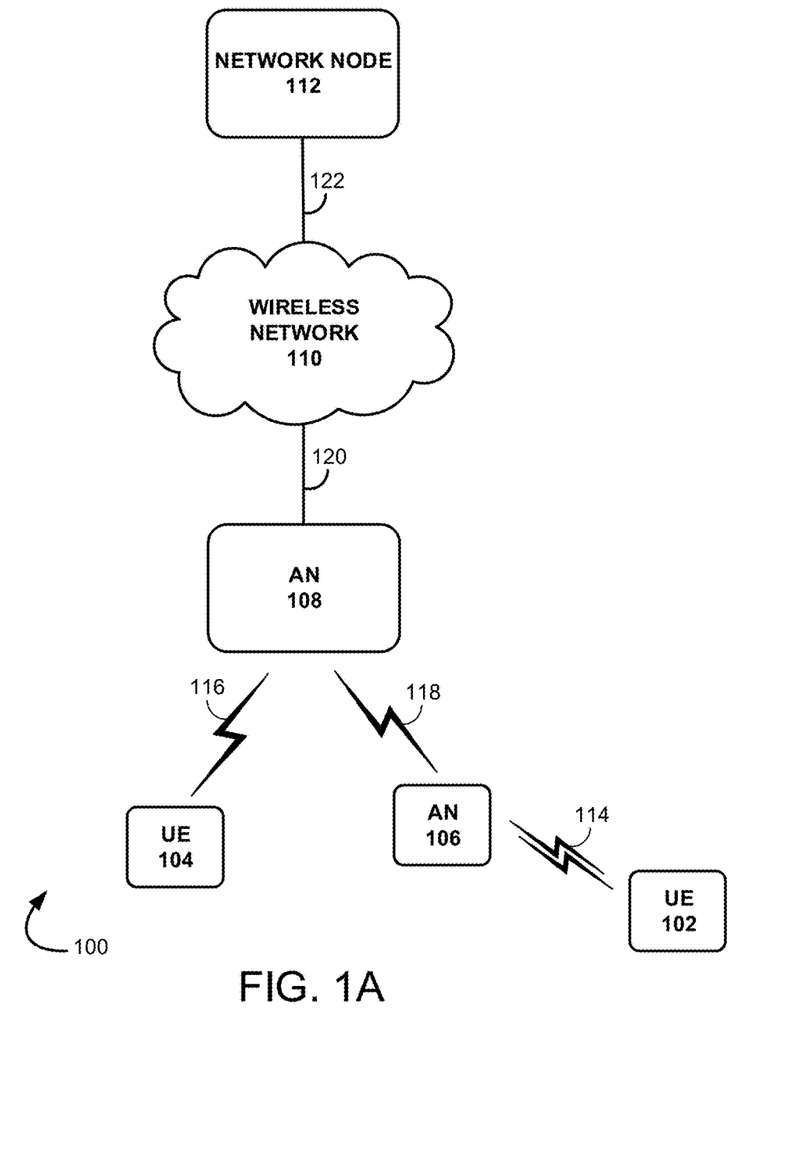
FIG. 1A illustrates an exemplary communication system for implicit information transfer in a wireless network.
Figures 1B, 1C:
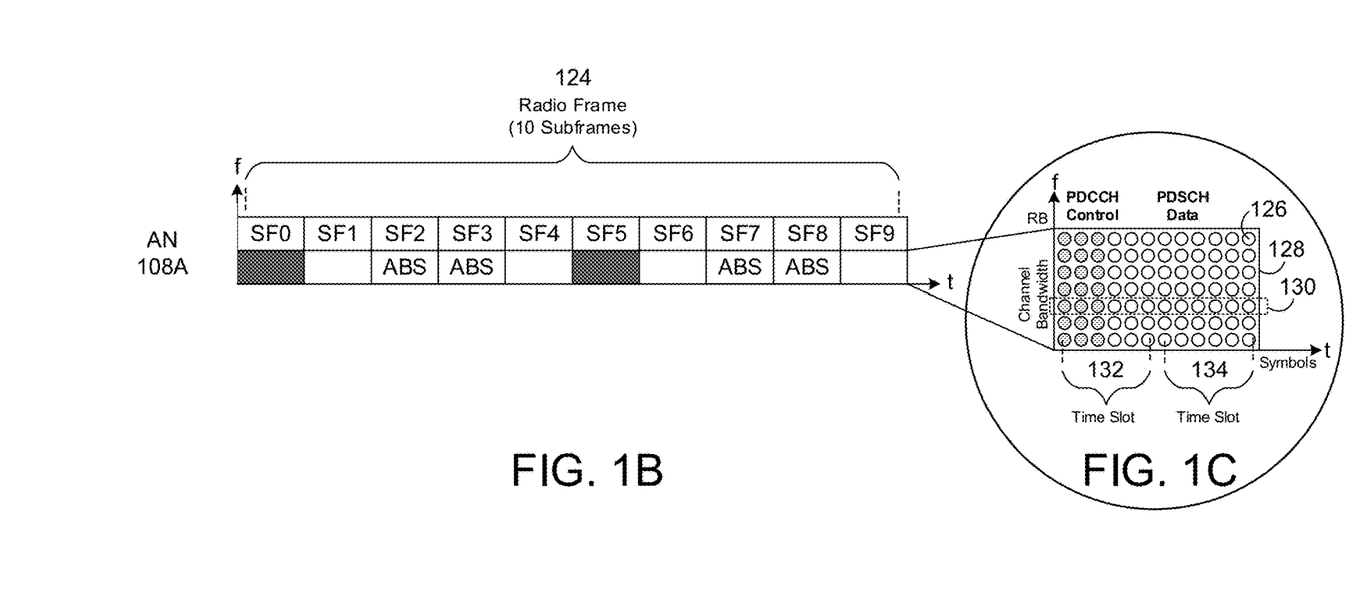
FIG. 1B illustrates an exemplary Almost Blank Subframe (ABS) pattern of an AN.
FIG. 1C illustrates an exemplary Resource Block (RB) of a data frame of the exemplary ABS pattern illustrated in FIG. 1B

Referring to FIGS. 1A-1C, RRHs (not shown) and/or low-power ANs 106 (e.g., picocells, femtocells, and relays) may be deployed within a radio range (i.e., minimum usable signal area) of macro ANs 108, 108A (i.e., highest DL signal strength) to increase capacity and/or coverage at "hotspots." Multiple macro ANs 108, 108A and/or low-power AN(s) 106 may send (or transmit) co-frequency signals (e.g., simultaneously) to cell-edge users (e.g., wireless devices 102, 104). Receipt of co-frequency signals (e.g., multiple signals) at cell-edge users 102, 104 causes radio interference, which results in low-throughput and/or dropped calls (i.e., performance degradation) for the cell-edge users 102, 104. For example, in operation, macro ANs 108, 108A may inflict high, radio interference on cell-edge user(s) 102 of low-power AN(s) 106 operating within a radio range (or overlapping coverage area) of macro ANs 108, 108A. To mitigate interference, macro AN's 108, 108A may designate/ schedule subframes of a data frame 124 as ABS' SF2, SF3, SF7, SF8, during which ABS' macro ANs 108, 108A periodically mute (or stop) broadcasts to enable the low-power AN(s) 106 to send (or receive) data from cell-edge (or other) user(s) 102.

For example, data frame 124 can be generated using a channel access method (e.g., an OFDMA scheme); network node 112 can assign resource elements (REs) 126 (e.g., indicative of data to be transmitted using a wireless interface) within a RB 128, where RB 128 includes REs distributed among a predetermined number of subcarriers (or subchannels) 130 over a time-period (e.g., predetermined or otherwise) using OFDMA. As illustrated in FIGS. 1B and 1C, data frame 124 can include a plurality of subframes SF0-SF9, where each subframe SF0-SF9 includes a predetermined number of RBs 128 and/or slots 132, 134. The number of RBs 128 available per unit of time (t) is based on the channel bandwidth (e.g., 1.25 MHz-20 MHz) of the system. RBs 128 can comprise a number of subcarriers (or subchannels) 130, where the number of subcarriers (or subchannels) 130 per RB(s) 128 is also based on the channel bandwidth of the system. REs 126 (or symbols) can include a plurality of bits, where the number of bits assigned per RE(s) 126 can be based on a signal condition and/or modulation scheme. For example, when radio conditions of wireless devices 102, 104 are excellent, 64-QAM (Quadrature Amplitude Modulation) can be used to assign six bits per RE(s) 126. When radio conditions are less than excellent, 16-QAM or 1-QPSK (Quadrature Phase Key Shifting) modulation can be used to assign four or two bits per RE(s) 126. RE(s) 126 can include the data to be sent (or transmitted) to/from wireless devices 102, 104 and a network node (e.g., macro ANs 108, 108A and/or low-power AN(s) 106). In some embodiments, RE(s) 126 can include reference signals. Reference signals can be dynamically assigned to subcarriers (or subchannels) 130 or could be assigned based on a (predetermined) pattern (e.g., ABS' pattern). Macro ANs 108, 108A, low-power AN(s) 106, and/or wireless devices 102, 104 receiving the RBs 128 can use the reference signals for synchronization (i.e., time and frequency parameters) purposes, to measure signal quality, and/or to identify the sender of the RBs 128. Macro ANs 108, 108A, low-power AN(s) 106, and/or wireless devices 102, 104 may use Primary Synchronization Sequence (PSS) and Secondary Synchronization Sequence (SSS), designated in FIG. 1B as SF0 and SF5, for synchronization (e.g., used by a user 102, 104 to determine time and frequency parameters necessary to demodulate DL signals, to transmit with correct timing, etc.) and/or to detect neighboring ANs 108, 108A and/or low-power AN(s) 106 for handover purposes. Subframes designated for PSS and/or SSS may not be scheduled/designated as ABS'.

As noted above, macro ANs 108, 108A may reserve portions of wireless spectrum (i.e., during the designated/ scheduled ABS' of an ABS pattern) to mitigate radio interference at cell-edge user(s) 102 (or other users) of low-power AN(s) 106 resultant from co-frequency signals. In one embodiment, macro ANs 108, 108A generate the ABS pattern using, for example, Multicast/Broadcast over Single-Frequency Subframes (MBSF), by not scheduling unicast traffic in certain subframes SF2, SF3, SF7, SF8, and/or by using its own algorithm. The ABS pattern may be generated based on a determined unique ABS ratio of macro ANs 108, 108A and/or based on an ABS table that includes a maximum number of ABS' based on bitmap (FDD=40 subframes, TDD=20 subframes). For example, the maximum number of ABS' based on a bitmap of 0-39 is 40 subframes and can be designated as a percentage, for example, 12.5%, and the enabling bit sequence for an ABS configuration based on the generated ABS table can be, for example, 1, 5, 11, 21, 31, etc. In an FDD system, the maximum bitmap ABS (e.g., 40) corresponds to four consecutive radio/data frames. Thus, the FDD ABS pattern may repeat every 40 milliseconds (ms) from SF0. In a TDD system, the maximum bitmap ABS is 20 subframes and corresponds to two consecutive radio/data frames. Thus, the TDD ABS pattern may repeat every 20 ms from SF0. The generated ABS pattern (illustrated in FIG. 1B) may be exchanged between macro ANs 108, 108A and/or low-power AN(s) 106 via a bitmap pattern; the ABS pattern (i.e., data frame 124) includes the designated/scheduled ABS' SF2, SF3, SF7, SF8. On receipt of the bitmap pattern (e.g., sent over an X2 interface), low-power AN(s) 106 may begin broadcasting (or sending) data to cell-edge user(s) 102 (or other users) at the designated/scheduled ABS' SF2, SF3, SF7, SF8.

ABS patterns and scheduled/designated ABS' create opportunities for macro ANs 108, 108A to coordinate with neighboring ANs 108, 108A and/or low-power AN(s) 106. For example, macro ANs 108, 108A may use generated ABS pattern(s) and/or ABS' scheduled/designated for low-power AN(s) 106 to convey (or communicate) implicit transmit symbols or "bits" to neighboring AN(s) 108, 108A and/or low-power AN(s) by scheduling/designating low-power AN(s) 106 on particular subframes of data frame 124. In one embodiment, macro ANs 108, 108A label potential ABS', for example, SF1-SF4 and SF6-SF9, with bit sequences. Based on implicit information ANs 108, 108A want (or need) to convey (or communicate) to neighboring macro AN(s) 108, 108A and/or low-power AN(s), macro ANs 108, 108A can coordinate with low-power AN(s) 106 and pick (or choose) a subframe SF1-SF9 and/or SF6-SF9 to designate/schedule as an ABS' for low-power AN(s) 106. Neighboring ANs 108, 108A and/or low-power AN(s) receive the implicit information from ANs 108, 108A by decoding the implicit transmit symbols or bits (i.e., by identifying the ABS', for example, SF2, SF3, SF7, SF8 that were selected for low-power AN(s) 106). Alternatively, neighboring ANs 108, 108A can monitor a level of radio interference and, when a sudden drop in radio interference (e.g., resultant from ABS' scheduling) is detected, ANs 108, 108A can decode the implicit transmit symbols or bits.

FIG. 1A illustrates an exemplary communication system 100 for implicit information transfer in a wireless network. FIG. 1B illustrates an exemplary Almost Blank Subframe (ABS) pattern. FIG. 1C illustrates an exemplary Resource Block (RB) of a data frame of the exemplary ABS pattern illustrated in FIG. 1B. System 100 can comprise wireless devices 102, 104, ANs 106, 108, 108A, wireless network 110, and network node 112. Other network elements may be present in the system 100 to facilitate communication but are omitted for clarity, such as controller nodes, base stations, base station controllers, gateways, Mobile-Switching Centers (MSC), Dispatch Application Processors (DAP), and location registers such a Home Location Register (HLR) or Visitor Location Register (VLR). Furthermore, other network elements may be present to facilitate communication between ANs 106, 108, 108A and wireless network 110, which are omitted for clarity, including additional processing nodes, routers, gateways, and physical and/or wireless data links for carrying data among the various network elements.

Wireless devices 102, 104 can be any device configured to communicate over system 100 using a wireless interface. For example, wireless devices 102, 104 can include a remote terminal unit, a cell phone, a smart phone, a computing platform such as a laptop, palmtop, or a tablet, a Personal Digital Assistant (PDA), or an internet access device, and combinations thereof. It is noted that while two wireless devices 102, 104 are illustrated in FIG. 1A as being in communication with ANs 106 and/or 108 any number of wireless devices can be implemented according to various exemplary embodiments disclosed herein.

Wireless devices 102, 104 can transmit and/or receive information over system 100 using various communication services. These services can include various voice, data, and/or Multimedia Broadcast Multicast Service (MBMS) services and applications. For example, mobile voice services, mobile data services, Push-to-Talk (PTT) services, internet services, web-browsing, email, pictures, picture messaging, video, video messaging, broadcast video, audio, voicemail, music MP3's, ring tones, stock tickers, news alerts, etc.

ANs 106, 108, 108A can be any network node configured to provide communication between wireless devices 102, 104 and wireless network 110. ANs 106, 108, 108A can be short-range ANs or standard ANs. A short-range AN (i.e., a low-power AN) could include a microcell base station, a picocell base station, a femtocell base station, relays or the like; a standard AN (i.e., a high-power AN) could include a base transceiver station, a radio base station, an eNodeB device, or an enhanced eNodeB device, a donor node or the like. ANs 106, 108, 108A may communicate scheduling decisions (e.g., DL scheduling assignments) to wireless devices 102, 104 and/or low-power AN(s) 106 using Downlink Control Information (DCI) carried by a Downlink Control Channel (PDCCH), illustrated in FIG. 1C. The DCI DL scheduling assignments may include, for example, Physical Downlink Shared Channel (PDSCH), illustrated in FIG. 1C, resource indication, a transport format, hybrid-ARQ information, control information (e.g., related to multiplexing), command for power control of the Physical Uplink Control Channel (PUCCH), uplink scheduling grants, Physical Downlink Shared Channel (PUSCH) resource indication, transport format (e.g., an index to a predefined table of Modulation and Coding Schemes (MCS), which may be QPSK, QAM16, QAM64, etc.), etc. ANs 106, 108, 108A may further include, for example: a higher Media Access Control (MAC) stack module configured to schedule wireless devices 102, 104 based on Channel State Information (CSI) sent to ANs 106, 108, 108A from wireless devices 102, 104; a lower MAC stack module configured to perform data handling functions (e.g., multiplexing, de-multiplexing, modulation, and/or de-modulation) of the transmit signals sent to ANs 106, 108, 108A from wireless devices 102, 104; and, pre-coding stack module configured to transmit the multiple transmit signals from ANs 106, 108, 108A to wireless devices 102, 104 based on a pre-coding weight (e.g., determined using Pre-Coding Matrix Information (PMI)). It is noted that while three ANs 106, 108, 108A are illustrated in FIGS. 1A and 1B, any number of ANs can be implemented within system 100.

Communication network 110 can be a wired and/or wireless communication network, and can comprise processing nodes, routers, gateways, and physical and/or wireless data links for carrying data among various network elements, including combinations thereof, and can include a Local Area Network (LAN), a Wide Area Network (WAN), and an internetwork (including the Internet). Communication network 110 can be capable of carrying data, for example, to support voice, PTT, broadcast video, and data communications by a wireless device, for example, wireless devices 102, 104. Wireless network protocols can comprise Code Division Multiple Access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 can also comprise additional base stations, controller nodes, telephony switches, internet routers, network gateways, computer systems, communication links, or some other type of communication equipment, and combinations thereof.

Network node 112 can be any network node configured to communicate information and/or control information over system 100. For example, network node 112 can receive information from or transmit information to wireless devices 102, 104 over system 100. For ease of illustration, network node 112 is shown to be located in the backhaul of system 100. However, network node 112 could alternatively be located between AN 108 and wireless network 110. Network node 112 can be a standalone computing device, computing system, or network component, and can be accessible, for example, by a wired or wireless connection, or through an indirect connection such as through a computer network or wireless network. For example, network node 112 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that network node 112 is not limited to any specific technology architecture, such as LTE, and can be used with any network architecture and/or protocol.

Communication links 114, 116, 118, 120, 122 can be wired or wireless and use various communication protocols such as Internet, Internet Protocol (IP), LAN, optical networking, Hybrid Fiber Coax (HFC), telephony, T1, or some other communication format—including combinations, improvements, or variations thereof. Wireless communication links can be a Radio Frequency (RF), microwave, infrared, or other similar signal, and can use a suitable communication protocol, for example, GSM, CDMA, WiMAX, or LTE, or combinations thereof. Other wireless protocols can also be used. Links 114, 116, 118, 120, 122 can be direct link or might include various equipment, intermediate components, systems, and networks.

Figure 2:
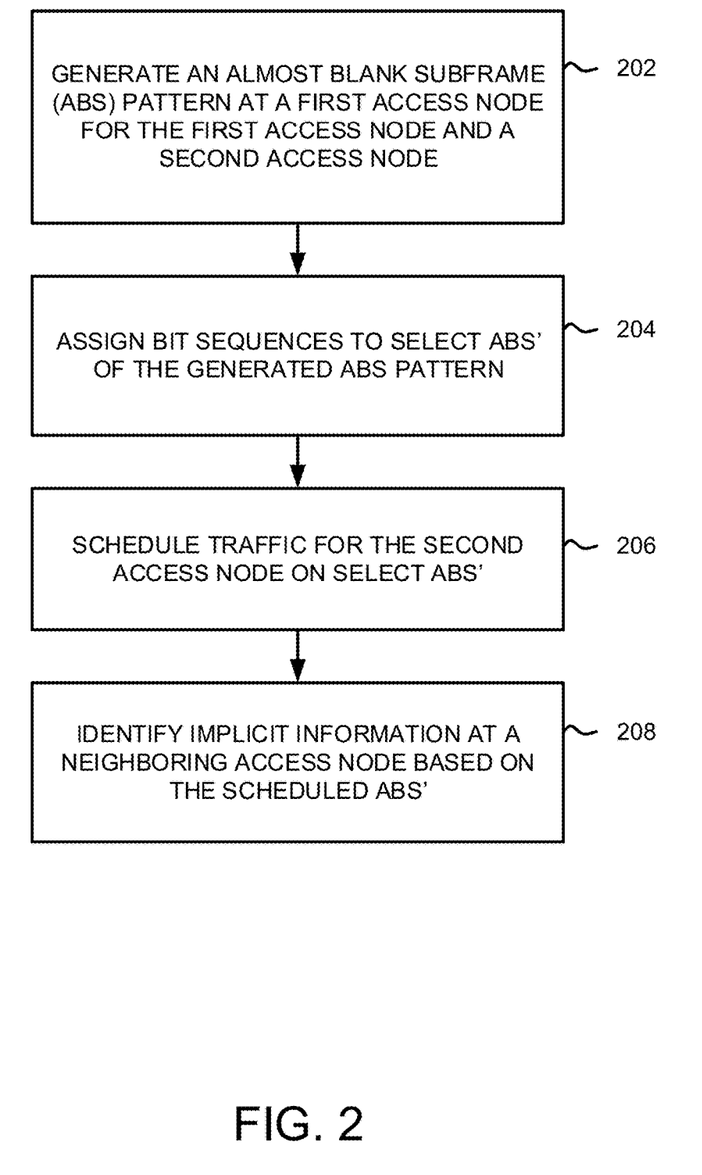
FIG. 2 illustrates a flow chart of an exemplary method for implicit information transfer in a wireless network.

FIG. 2 illustrates a flow chart of an exemplary method for implicit information transfer in a wireless network. The method will be discussed with reference to the exemplary communication system 100 illustrated in FIGS. 1A-1C.

However, the method for implementing an enhanced multi-antenna transmission scheme illustrated in FIG. 2 can be implemented with any suitable communication system. In addition, although FIG. 2 depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, combined, and/or adapted in various ways.

Migration from voice-centralized services to data-centralized services (e.g., internet, applications, cloud-based services including video and other bandwidth-intensive content, etc.) boosts traffic at macro ANs 108, 108A. In Heterogeneous Networks (HetNet), a multilayer structure that includes a mix of macro ANs 108, 108A, RRHs (not shown), and low-power AN(s) 106 may be leveraged to increase network capacity. But, aggressive deployment of low-power ANs (e.g., in an ad hoc manner) within a radio range (i.e., minimum usable signal area) of macro ANs 108, 108A may result in decreased throughput to wireless devices 102, 104 operating at cell-edges of either macro ANs 108, 108A or low-power AN(s) 106 due to radio interference from neighboring ANs (e.g., macro ANs 108, 108A, low-power AN(s) 106, etc.). Radio interference may significantly degrade overall network performance. eICIC techniques (e.g., subframe alignment using ABS', OFDM Symbol Shift, etc.) create opportunities for wireless devices 102, 104 operating at cell-edges of low-power AN(s) 106 (or macro ANs 108, 108A) to receive DL data (or information) from the network 110 without interference from neighboring ANs. Macro ANs 108, 108A may assign patterns of ABS to low-power AN(s) 106 and/or coordinate ABS patterns with neighboring ANs to reduce interference at the cell-edges of low-power AN(s) 106 and/or macro ANs 108, 108A. In addition, assignment of patterns (or individual) ABS' to low-power AN(s) 106 and/or macro ANs 108, 108A creates additional opportunities to convey implicit information to neighboring ANs through assignment of implicit transmit symbols or bits to individual subframes SF1-SF4 and/or SF6-SF9 of a data frame 124 of a generated ABS pattern.

For example, at 202, an ABS pattern may be generated at macro AN 108 for macro AN 108 and low-power AN(s) 106 operating within a radio range of macro AN 108. For example, macro AN 108 may detect wireless devices 102 operating at a cell-edge of a low-power AN 106 operating in a radio range of macro AN 108 and suffering from strong radio interference on the DL (e.g., an SINR value for DL control channel below −4 dB). Macro AN 108 may designate/schedule subframes SF1-SF4 and/or SF6-SF9 of data frame 124 as ABS' (i.e., AN 108 may designate/schedule SF2, SF3, SF7, SF8 as ABS'), during which ABS' macro AN 108 ceases or periodically mutes (or stops) broadcasts (or transmission) to wireless device 104 and/or low-power AN(s) 106 to enable the low-power AN(s) 106 the opportunity to send (or receive) data from cell-edge (or other) user(s) 102.

At 204, macro AN 108 may assign implicit transmit symbols or bits to the designated/scheduled ABS' SF2, SF3, SF7, SF8 of the ABS pattern. For example, operating under the assumption that neighboring ANs (e.g., macro ANs 108, 108A, low-power AN(s) 106, etc.) can detect (or determine) designated/scheduled ABS' of an ABS pattern (e.g., by "listening" for reduced radio interference), macro AN 108 may send implicit information to neighboring ANs by encoding scheduled/designated ABS' of an ABS pattern with implicit transmit symbols or bits.

At 206, macro AN 108 may schedule traffic for the low-power AN(s) 106 on select ABS' of the generated ABS pattern based on implicit information (i.e., implicit transmit symbols or bits) macro AN 108 wants (or needs) to convey to a neighboring AN, for example, macro AN 108A. For example, macro AN 108 can coordinate with low-power AN(s) 106 and pick (or choose) subframe(s) SF1-SF4 and/or SF6-SF9 to designate/schedule as an ABS' for low-power AN(s) 106 based on implicit transmit symbols or bits assigned to that subframe SF1-SF4 and/or SF6-SF9. Macro AN 108 may send (or exchange) the generated ABS pattern (illustrated in FIG. 1B) with low-power AN(s) 106 via a bitmap pattern; the ABS pattern (i.e., data frame 124) includes the designated/scheduled ABS' SF2, SF8 for low-power AN(s) 106. On receipt of the bitmap pattern (e.g., sent over an X2 interface), low-power AN(s) 106 may begin broadcasting (or sending) data to cell-edge user(s) 102 (or other users) at the designated/scheduled ABS' SF2, SF8.

At 208, neighboring AN 108A may decode the implicit information (i.e., implicit transmit symbols or bits) by identifying the ABS pattern generated at macro AN 108 and/or by identifying the ABS' of the ABS pattern generated at macro AN 108. For example, neighboring AN 108A can receive the implicit information from AN 108 by decoding the implicit transmit symbols or bits (i.e., by identifying the ABS' SF2, SF8 selected for low-power AN(s) 106). Alternatively, neighboring AN 108A can monitor a level of radio interference and/or "listen" for a drop in radio interference resultant from ABS' scheduling for low-power AN(s) 106 and, when detected, macro AN 108A can decode the implicit transmit symbols or bits for that time-frame.

Figure 3A:
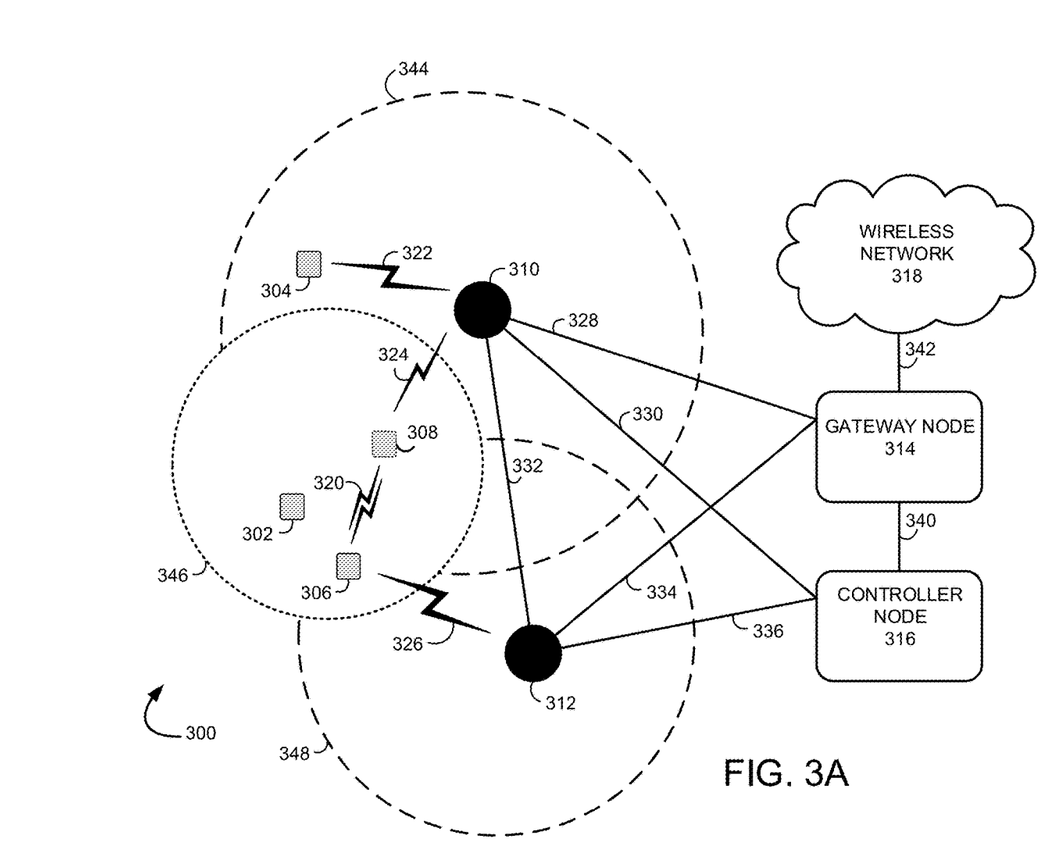
FIG. 3A illustrates another exemplary communication system for implicit information transfer in a wireless network.
Figure 3B:
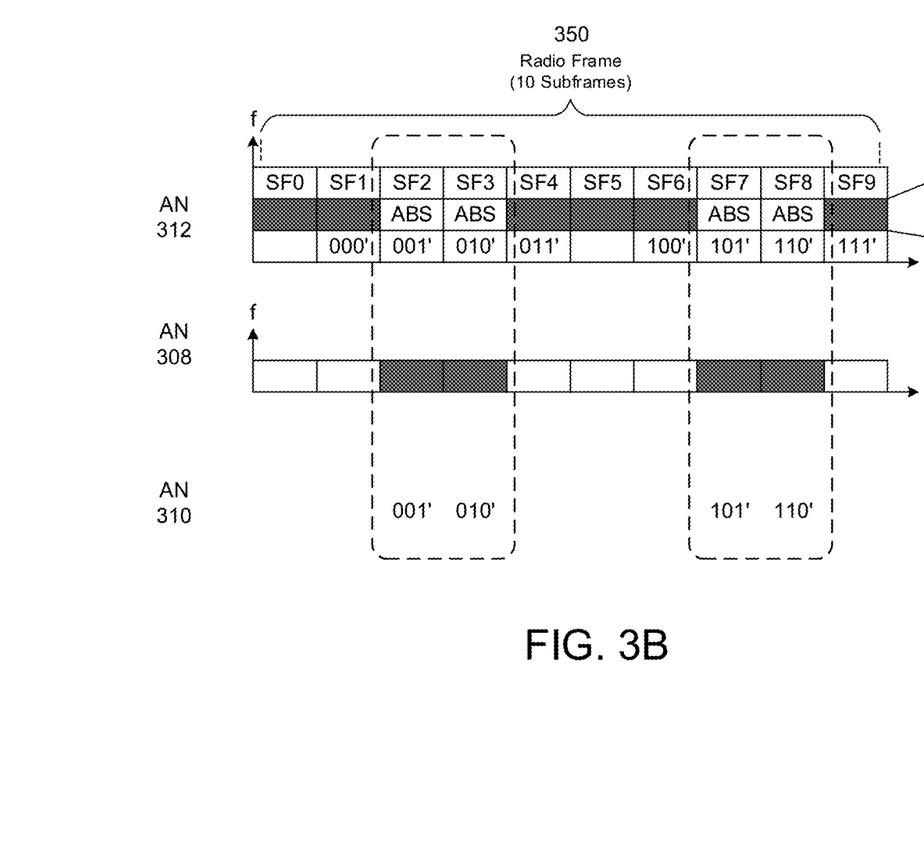
FIG. 3B illustrates an exemplary ABS pattern of an AN.
Figure 3C:
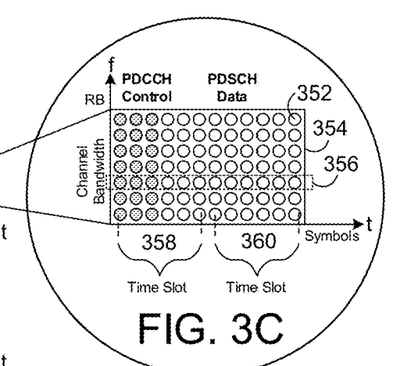
FIG. 3C illustrates an exemplary RB of a data frame of the exemplary ABS pattern illustrated in FIG. 3B.

FIG. 3A illustrates another exemplary system for implicit information transfer in a wireless network. FIG. 3B illustrates an exemplary ABS pattern of an AN. FIG. 3C illustrates an exemplary RB of a data frame of the exemplary ABS pattern illustrated in FIG. 3B. System 300 can comprise wireless devices 302, 304, 306, ANs 308, 310, 312, controller node 316, gateway node 314, and wireless network 318. ANs 308, 310, 312 may include an inspection module (not shown). Alternatively, an inspection node (not shown) may be in the backhaul of system 300. The communications between wireless devices 302, 304, 306 and/or ANs 308, 310, 312 may be relayed, monitored, and/or inspected by the inspection module of ANs 308, 310, 312 and/or inspection node.

Other network elements may be present in the communication system 300 to facilitate communication but are omitted for clarity, such as base stations, base station controllers, gateways, MSC, DPAs, and location registers such as a HLR or VLR. Furthermore, other network elements may be present to facilitate communication, such as between ANs 308, 310, 312 and wireless network 318, which are omitted for clarity, including additional processing nodes, routers, gateways, and physical and/or wireless data links for carrying data among the various network elements.

Wireless devices 302, 304, 306 can be any device configured to communicate over system 300 using a wireless interface. For example, wireless devices 302, 304, 306 can include a remote terminal unit, a cell phone, a smart phone, a computing platform such as a laptop, palmtop, or a tablet, a PDA, or an internet access device, and combinations thereof. Wireless devices 302, 304, 306 can include one or more transceivers for transmitting and receiving data over system 300. Each transceiver can be associated with the same or different frequency bands, the same or different radio access technologies, the same or different network providers, and/or the same or different services. For example, wireless devices 302, 304, 306 can include Tx/Rx antennas that are associated with one or more of the following: CDMA, GSM, WiMAX, LTE, HSDPA, IEEE 802.11, WiFi, Bluetooth, Zigbee, IrDA, MBMS, etc.

Wireless devices 302, 304, 306 can be connected with ANs 308, 310, 312 through communication links 320, 322, 324, 326. Links 320, 322, 324, 326 can use various communication media, such as air, space, metal, optical fiber, or some other signal propagation path—including combinations thereof. Links 320, 322, 324, 326 may comprise many different signals sharing the same link. Links 320, 322, 324, 326 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless devices 302, 304, 206 and ANs 308, 310, 312 could share the same representative wireless link, but be transferred over different communication sessions, frequencies, timeslots, packets, ports, sockets, logical transport links, or in different directions—including combinations thereof.

Wireless devices 302, 304, 306 can transmit and/or receive information over system 300 using various communication services. These services can include various voice, data, and/or MBMS services and applications. For example, mobile voice services, mobile data services, PTT services, internet services, web browsing, email, pictures, picture messaging, video, video messaging, broadcast video, audio, voicemail, music, MP3's, ring tones, stock tickers, new alerts, etc.

ANs 308, 310, 312 can be any network node configured to provide communication between wireless devices 302, 304, 306 and wireless network 318. ANs 308, 310, 312 can be short-range ANs or standard ANs. A short-range AN (i.e., a low-power AN) could include a microcell base station, a picocell base station, a femtocell base station, relays or the like; a standard AN (i.e., a high-power AN) could include a base transceiver station, a radio base station, an eNodeB device, or an enhanced eNodeB device, a donor node or the like. ANs 308, 310, 312 may communicate scheduling decisions (e.g., DL scheduling assignments) to wireless devices 302, 204, 306 and/or low-power AN(s) 106 using Downlink Control Information (DCI) carried by a Downlink Control Channel (PDCCH), illustrated in FIG. 3C. The DCI DL scheduling assignments may include, for example, Physical Downlink Shared Channel (PDSCH), illustrated in FIG. 3C, resource indication, a transport format, hybrid-ARQ information, control information (e.g., related to multiplexing), command for power control of the Physical Uplink Control Channel (PUCCH), uplink scheduling grants, Physical Downlink Shared Channel (PUSCH) resource indication, transport format (e.g., an index to a predefined table of Modulation and Coding Schemes (MCS), which may be QPSK, QAM16, QAM64, etc.), etc. ANs 308, 310, 312 may further include, for example: a higher Media Access Control (MAC) stack module configured to schedule wireless devices 302, 304, 306 based on Channel State Information (CSI) sent to ANs 308, 310, 312 from wireless devices 302, 304, 306; a lower MAC stack module configured to perform data handling functions (e.g., multiplexing, de-multiplexing, modulation, and/or de-modulation) of the transmit signals sent to ANs 308, 310, 312 from wireless devices 302, 304, 306; and, pre-coding stack module configured to transmit the multiple transmit signals from ANs 308, 310, 312 to wireless devices 302, 304, 306 based on a pre-coding weight (e.g., determined using Pre-Coding Matrix Information (PMI)). It is noted that while three ANs 308, 310, 312 are illustrated in FIGS. 3A and 3B, any number of ANs can be implemented within system 300.

ANs 308, 310, 312 can comprise a processor and associated circuitry to execute or direct the execution of computer-readable instructions to obtain information. ANs 308, 310, 312 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. ANs 308, 310, 312 can receive instructions and other input at a user interface.

Gateway node 314 can be any network node configured to interface with other network nodes using various protocols. Gateway node 314 can communicate user data over system 300. Gateway node 314 can be a standalone computing device, computing system, or network component, and can be accessible, for example, by a wired or wireless connection, or through an indirect connection such as through a computer network or cellular network. For example, gateway node 314 can include a Serving Gateway (SGW) and/or a Public Data Network Gateway (PGW), etc. One of ordinary skill in the art would recognize that gateway node 314 is not limited to any specific technology architecture, such as LTE and can be used with any network architecture and/or protocol.

Gateway node 314 can comprise a processor and associated circuitry to execute or direct the execution of computer-readable instructions to obtain information. Gateway node 314 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 314 can receive instructions and other input at a user interface.

Controller node 316 can be any network node configured to communicate information and/or control information over system 300. Controller node 316 can be configured to transmit control information associated with a handover procedure. Controller node 316 can be a standalone computing device, computing system, or network component, and can be accessible, for example, by a wired or wireless connection, or through an indirect connection such as through a computer network or cellular network. For example, controller node 316 can include a MME, a HSS, a PCRF, an AAA node, a RMS, a SPS, a policy server, etc. One of ordinary skill in the art would recognize that controller node 316 is not limited to any specific technology architecture, such as LTE and can be used with any network architecture and/or protocol.

Controller node 316 can comprise a processor and associated circuitry to execute or direct the execution of computer-readable instructions to obtain information. Controller node 316 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 316 can receive instructions and other input at a user interface.

AN 308 may be connected with AN 310 through communication link 324. AN 308 may be connected with gateway node 314 through AN 310 and with controller node 316 through AN 310. AN 310 may be connected with gateway node 314 through communication link 328 and with controller node 316 through communication link 330. AN 310 may be connected with AN 312 through communication link 332. AN 312 may be connected with gateway node 314 through communication link 334 and with controller node 316 through communication link 336. Gateway node 314 may be connected with controller node 316 through communication link 340 and with wireless network 318 through communication link 342. Links 324, 328, 330, 332, 334, 336, 340, 342 can be wired or wireless and use various communication protocols such as Internet, IP, LAN, optical networking, HFC, telephony, T1, or some other communication format—including combinations, improvements, or variations thereof. Links 324, 328, 330, 332, 334, 336, 340, 342 can be a RF, microwave, infrared, or other similar signal, and can use a suitable communication protocol, for example, GSM, CDMA, WiMAX, or LTE, or combinations thereof. Other wireless protocols can also be used. Links 324, 328, 330, 332, 334, 336, 340, 342 can be a direct link or might include various equipment, intermediate components, systems, and networks. The communications between wireless devices 302, 304, 306 and ANs 308, 310, 312 and/or wireless network 318 may be relayed, monitored, and/or inspected by an inspection module at ANs 308, 310, 312 and/or an inspection node.

Wireless network 318 can be a wired and/or wireless communication network, and can comprise processing nodes, routers, gateways, and physical and/or wireless data links for carrying data among various network elements, including combinations thereof, and can include a LAN or WAN, and an internetwork (including the internet). Wireless network 318 can be capable of carrying data, for example, to support voice, PTT, broadcast video, and data communications by a wireless device, such as wireless device 302, 304, 306. Wireless network protocols can comprise MBMS, CDMA 1xRTT, GSM, UMTS, HSPA, EV-DO, EV-DO rev. A, 3GPP LTE, and WiMAX. Wired network protocols that may be utilized by wireless network 318 comprise Ethernet, Fast Ethernet, Gigabit Ethernet, Local Talk (such as Carrier Sense Multiple Access with Collision Avoidance), Token Ring, FDDI, ATM. Wireless network 318 can also comprise additional base stations, controller nodes, telephony switches, internet routers, network gateways, computer systems, communication links, or some other type of communication equipment, and combinations thereof.

Referring to FIG. 3, in one embodiment, AN 308 can be configured as a low-power AN 308 (e.g., a short-range AN that includes a microcell, a picocell, and/or a femtocell base station, relays, or the like) and may be deployed within a radio range (i.e., minimum usable signal area) 344 of macro AN 310 (e.g., a high-power AN that includes a base transceiver station, a radio base station, an eNodeB device, or an enhanced eNodeB device, and/or a donor node or the like). Low-power AN 308 can be directly or indirectly connected to gateway node 314 or another network node and can be configured to support multiple wireless devices 302, 306. In one embodiment, wireless device 306 moves toward a cell-edge 346 of low-power AN 308 (i.e., cell-edge user); at the cell-edge 346, wireless device 306 experiences (or suffers from) strong radio interference on the DL (e.g., an SINR value for DL control channel below −4 dB). Macro AN 310 may implement eICIC techniques and assign patterns of ABS' to low-power AN 308. For example, to mitigate interference at cell-edge user 306, macro AN 310 may designate/schedule subframes SF0-SF9 of a data frame 350 as ABS' (e.g., SF2, SF3, SF7, SF8), during which ABS' macro AN 310 periodically mutes (or stops) broadcasts (or transmissions) to enable low-power AN 308 to send (or receive) data from cell-edge user 306.

Data frame 350 can include a plurality of subframes SF0-SF9, where each subframe includes and predetermined number of RBs 354 and/or slots 358, 360; data frame 350 can be generated using a channel access method (e.g., an OFDMA scheme); macro AN 310 can assign REs 352 within RB 354, where RB 354 includes REs 352 distributed among a predetermined number of subcarriers (or subchannels) 356 over a time-period (e.g., predetermined or otherwise) using OFDMA. Macro AN 310 may reserve SF0 and SF5 for PSS and/or SSS synchronization and/or for handover purposes.

Macro AN 310 may generate an ABS pattern using, for example, MBSF, by not scheduling unicast traffic in certain subframes (e.g., SF2, SF3, SF7, SF8), and/or by using its own algorithm. The ABS pattern may be generated based on a determined unique ABS ratio of macro AN 310 and/or based on an ABS table that includes a maximum number of ABS' based on bitmap (e.g., FDD=40 subframes, TDD=20 subframes). The generated ABS pattern may be exchanged between macro AN 310, low-power AN 308, and/or neighboring AN 312 (e.g., a short-range AN and/or a standard AN) via a bitmap pattern; the ABS pattern (i.e., data frame 350) includes the designated/scheduled ABS' SF2, SF3, SF7, SF8. On receipt of the bitmap pattern (e.g., sent over an X2 interface), low-power AN 308 may begin broadcasting (or sending) data to cell-edge user 302 during the designated/scheduled ABS' SF2, SF3, SF7, SF8.

Figure 4:
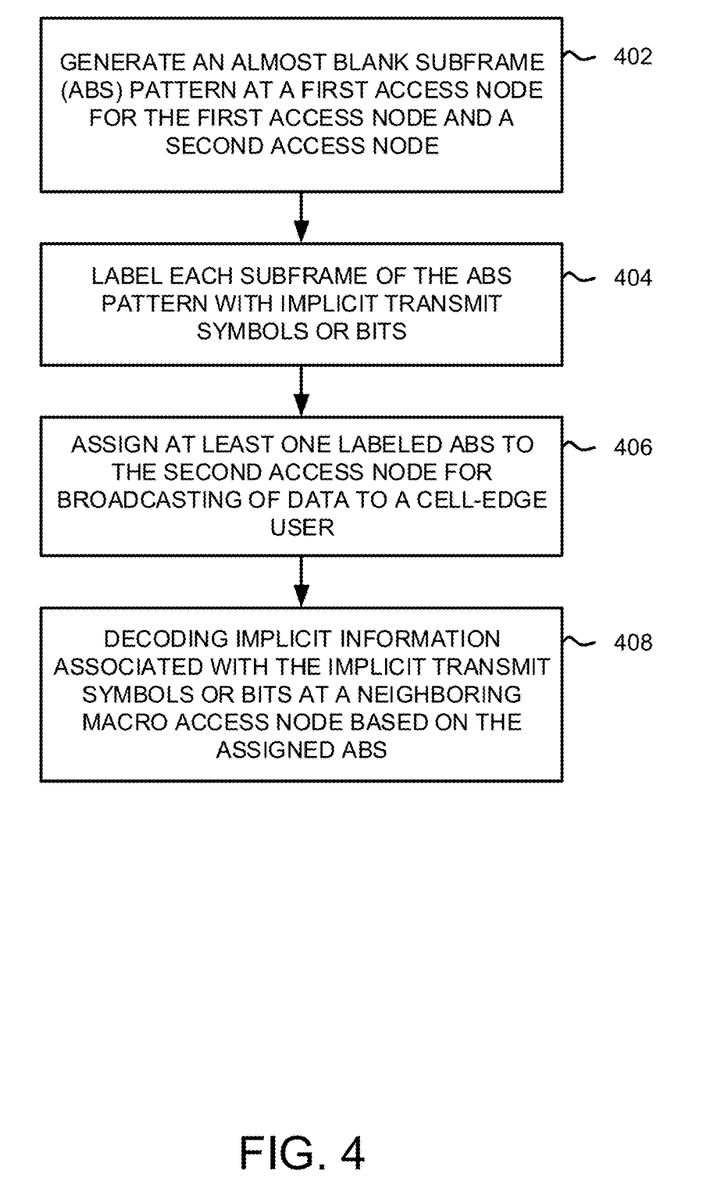
FIG. 4 illustrates another flow chart of an exemplary method for implicit information transfer in a wireless network.

FIG. 4 illustrates a flow chart of an exemplary method for implicit information transfer in a wireless network. The method will be discussed with reference to the exemplary system 300 illustrated in FIGS. 3A-3C. But, the method for implicit information transfer illustrated in FIG. 4 can be implemented in the exemplary system 100 illustrated in FIGS. 1A-1C, or with any suitable communication system. In addition, although FIG. 4 depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, combined, and/or adapted in various ways.

ABS patterns and scheduled/designated ABS' create opportunities for macro AN 310 to coordinate with neighboring AN 312 and/or low-power AN 308. For example, macro AN 310 may use a generated ABS pattern and/or ABS' scheduled/designated for low-power AN 308 to convey (or communicate) implicit transmit symbols or bits to neighboring AN 312 and/or low-power AN 308 by scheduling/designating low-power AN 308 on particular subframes SF1-SF4 and/or SF6-SF9 of data frame 350. Macro AN 310 may label potential ABS' (or all subframes SF0-SF9) with bit sequences. Based on implicit information macro AN 310 wants (or needs) to convey (or communicate) to neighboring AN 312 and/or low-power AN 308, macro AN 310 can coordinate with low-power AN 308 and pick (or choose) a subframe SF1-SF4 and/or SF6-SF9 to designate/schedule as an ABS' for low-power AN 308. Neighboring AN 312 and/or low-power AN 308 receive the implicit information from macro AN 310 by decoding the implicit transmit symbols or bits (i.e., by identifying the ABS' SF2, SF3, SF7, SF8 selected for low-power AN 106). Alternatively, neighboring AN 312 can monitor a level of radio interference and/or "listen" for a drop in radio interference resultant from ABS' scheduling for low-power AN 308 and, when detected, neighboring AN 312 can decode the implicit transmit symbols or bits for that time-frame.

At 402, macro AN 310 may generate an ABS pattern for macro AN 310 and low-power AN 308 operating within a radio range 344 of macro AN 310. Low-power AN 308 may be configured to support multiple wireless devices 302, 306. Wireless device 306 moves toward a cell-edge 346 of low-power AN 308 (i.e., a cell-edge user); at the cell-edge 346, wireless device 306 experiences (or suffers from) strong radio interference on the DL (e.g., an SINR value for DL control channel below −4 dB). Macro AN 310 may designate/schedule subframes S1-S4 and/or S6-S9 of data frame 350 as potential ABS', during which ABS', macro AN 310 and/or neighboring AN 312 (e.g., if macro AN 310 shares its ABS pattern with neighboring AN 312 and/or wireless network 318 assigns a common ABS pattern to macro AN 310 and neighboring AN 312) ceases or periodically mutes (or stops) broadcasts (or transmission) to wireless device 304 and/or low-power AN 308 to enable low-power AN 308 the opportunity to send (or receive) data from cell-edge user 306. Macro AN 310 may reserve SF0 and/or SF5 for PSS and/or SSS synchronization and/or for handover purposes.

At 404, macro AN 310 may label each subframe of the generated ABS pattern with implicit transmit symbols or bits. Operating under the assumption that neighboring AN 312 and/or low-power AN 308 can detect (or determine) designated/scheduled ABS' of an ABS pattern (e.g., by "listening" for reduced radio interference), macro AN 310 may send implicit information to neighboring AN 312 and/or low-power AN 308 by encoding scheduled/designated ABS' of the ABS pattern with implicit transmit symbols or bits. For example, wireless network 318 and/or macro AN 310 may assign and/or preconfigure SF1-SF4 and/or SF6-SF9 of data frame 350 to/with implicit transmit symbols or bits "000", "001", "010", "011", "100", "101", "110", "111", etc. The implicit transmit symbols or bits "000", "001", "010", "011", "100", "101", "110", "111", etc., may be used to convey (or communicate) implicit information from macro AN 310 to neighboring ANs (e.g., neighboring AN 312 and/or low-power AN 308). Wireless network 318 and/or macro AN 310 can inform neighboring AN 312, low-power AN 306, and/or wireless devices 302, 304, 306 of the assignment and/or configuration.

At 406, macro AN 310 may assign at least one labeled ABS' to low-power AN 308 for broadcasting (or sending) data to cell-edge user 306 at the designated/scheduled ABS'. Macro AN 310 may schedule traffic for the low-power AN 308 on select ABS' of data frame 350 based on implicit information (i.e., implicit transmit symbols or bits) macro AN 310 wants (or needs) to convey to neighboring AN 312. Macro AN 310 can coordinate with low-power AN 308 and pick (or choose) subframe(s) SF1-SF4 and/or SF6-SF9 to designate/schedule as an ABS' for low-power AN 308 based on implicit transmit symbols or bits assigned to that subframe SF1-SF4 and/or SF6-SF9. For example, referring to FIG. 3B, macro AN 310 may want (or need) to convey implicit information to neighboring AN 312 associated with implicit transmit symbols or bits "001", "010", "101", and "110". Macro AN 310 can coordinate with low-power AN 308 and pick (or choose) subframe(s) SF2, SF3, SF7, SF8 (i.e., subframes assigned and/or pre-configured with implicit transmit symbols or bits "001", "010", "101", and "110") to designate/schedule as ABS' for low-power AN 308. Macro AN 310 may send (or exchange) the generated ABS pattern (illustrated in FIG. 3B) with low-power AN 308 via a bitmap pattern; the ABS pattern (i.e., data frame 350) includes the designated/scheduled ABS' SF2, SF3, SF7, SF8 for low-power AN 308. On receipt of the bitmap pattern (e.g., sent over an X2 interface), low-power AN 308 may begin broadcasting (or sending) data to cell-edge user 306 at the designated/scheduled ABS' SF2, SF3, SF7, SF8.

At 408, neighboring AN 312 may decode the implicit information associated with implicit transmit symbols or bits "001", "010", "101", and "110" by identifying the ABS pattern generated at macro AN 310 and/or by identifying the ABS' assigned to low-power AN 308 at macro AN 310. For example, neighboring AN 312 can receive the implicit information from macro AN 310 by decoding the implicit transmit symbols or bits "001", "010", "101", and "110" (i.e., by identifying ABS' SF2, SF3, SF7, SF8 selected for low-power AN 308). Alternatively, neighboring AN 312 can monitor a level of radio interference and/or "listen" for a drop in radio interference resultant from ABS' scheduling for low-power AN 308 and, when detected, neighboring AN 312 can decode the implicit transmit symbols or bits "001", "010", "101", and "110" for that time-frame.

Figure 5:
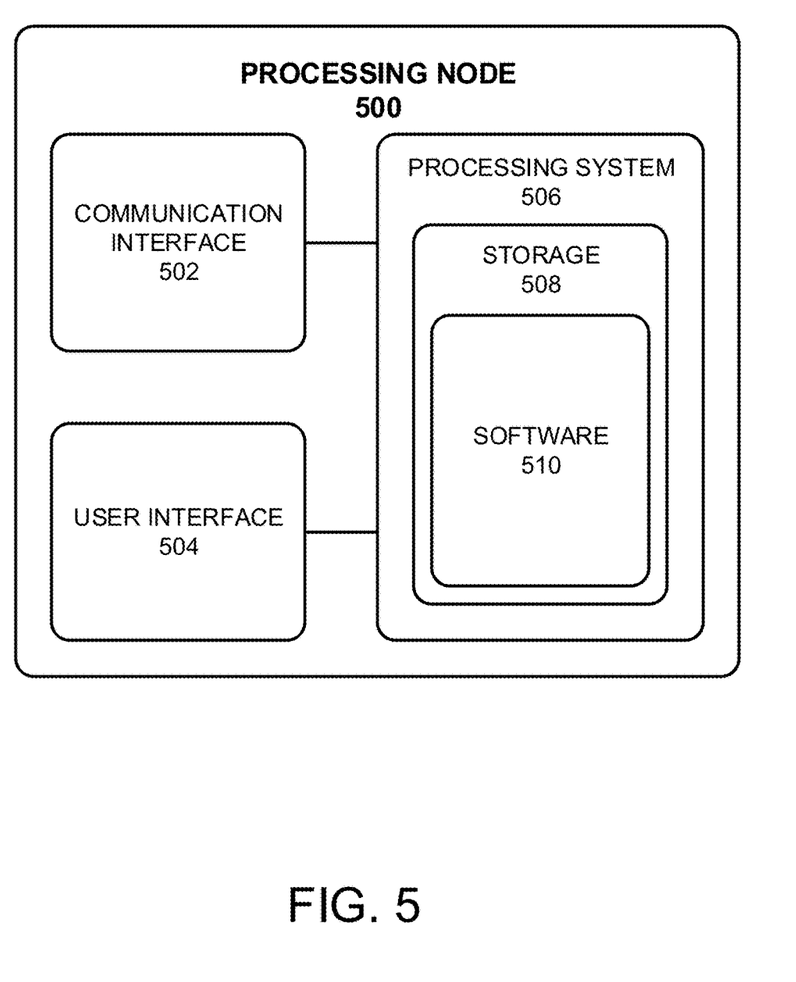
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication AN for a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include ANs 106, 108, 108A, 308, 310, 312, network node 112, gateway node 314, and controller node 316, and inspection module and/or node (not shown). Processing node 500 can also be an adjunct or component of a network element, such as an element of ANs 106, 108, 108A, 308, 310, 312, network node 112, gateway node 314, and controller node 316, and inspection module and/or node (not shown). Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for implicit information transfer, the method comprising:
   assigning predetermined bit sequences to individual subframes of a data frame at a first access node;
   encoding implicit information into bit sequences;
   scheduling an almost blank subframe (ABS) pattern to subframes of the data frame, the ABS pattern corresponding to the encoded implicit information; and
   instructing a neighboring access node to decode the encoded implicit information at the neighboring access node using the predetermined bit sequences assigned to the scheduled ABS.

2. The method of claim 1, wherein the first access node is a high-power access node and the neighboring access node is a low-power access node.

3. The method of claim 2, wherein the neighboring access node is located within a radio range of the first access node and supports at least one wireless device.

4. The method of claim 3, wherein the at least one wireless device operates at a cell-edge of the neighboring access node and suffers from strong radio interference from the neighboring access node on a downlink (DL) control channel.

5. The method of claim 1, further comprising:
   monitoring, at the neighboring access node, a level of radio interference associated with at least one wireless device supported by the neighboring access node.

6. The method of claim 1, wherein the bit sequences are decoded at the neighboring access node when a drop in radio interference at a wireless device supported by the neighboring access node is detected.

7. The method of claim 6, wherein the drop in radio interference occurs when the first access node schedules one or more ABS for the neighboring access node.

8. A system for implicit information transfer, the system comprising:
   a first processing node configured to:
      assign predetermined bit sequences to individual subframes of a data frame;
      encode implicit information into bit sequences; and
      schedule an almost blank subframe (ABS) pattern to subframes of the data frame, the ABS pattern corresponding to the encoded implicit information; and
   a neighboring processing node configured to decode the encoded implicit information using the predetermined bit sequences assigned to the scheduled ABS.

9. The system of claim 8, wherein the first processing node is a high-power access node and the neighboring processing node is a low-power access node.

10. The system of claim 9, wherein the neighboring processing node is located within a radio range of the first processing node and supports at least one wireless device.

11. The system of claim 10, wherein the at least one wireless device operates at a cell-edge of the neighboring processing node and suffers from strong radio interference from the neighboring processing node on a downlink (DL) control channel.

12. The system of claim 8, wherein the neighboring processing node is further configured to:
   monitor a level of radio interference associated with at least one wireless device supported by a second access node.

13. The system of claim 8, wherein the bit sequences are decoded by the neighboring processing node when a drop in radio interference at at least one wireless device supported by a second access node is detected.

14. The system of claim 13, wherein the drop in radio interference occurs when the first processing node schedules one or more ABS for the second access node.

15. A method for implicit information transfer, the method comprising:
   coordinating, at neighboring access nodes, an Almost Blank Subframe (ABS) pattern for ABS transmissions;
   assigning implicit transmit symbols to ABS' of the ABS pattern;
   encoding implicit information into bit sequences; and
   scheduling traffic for a wireless device on at least one ABS of the ABS pattern, the scheduled ABS being used by the neighboring access nodes to decode the implicit information.

* * * * *